Patented May 22, 1951

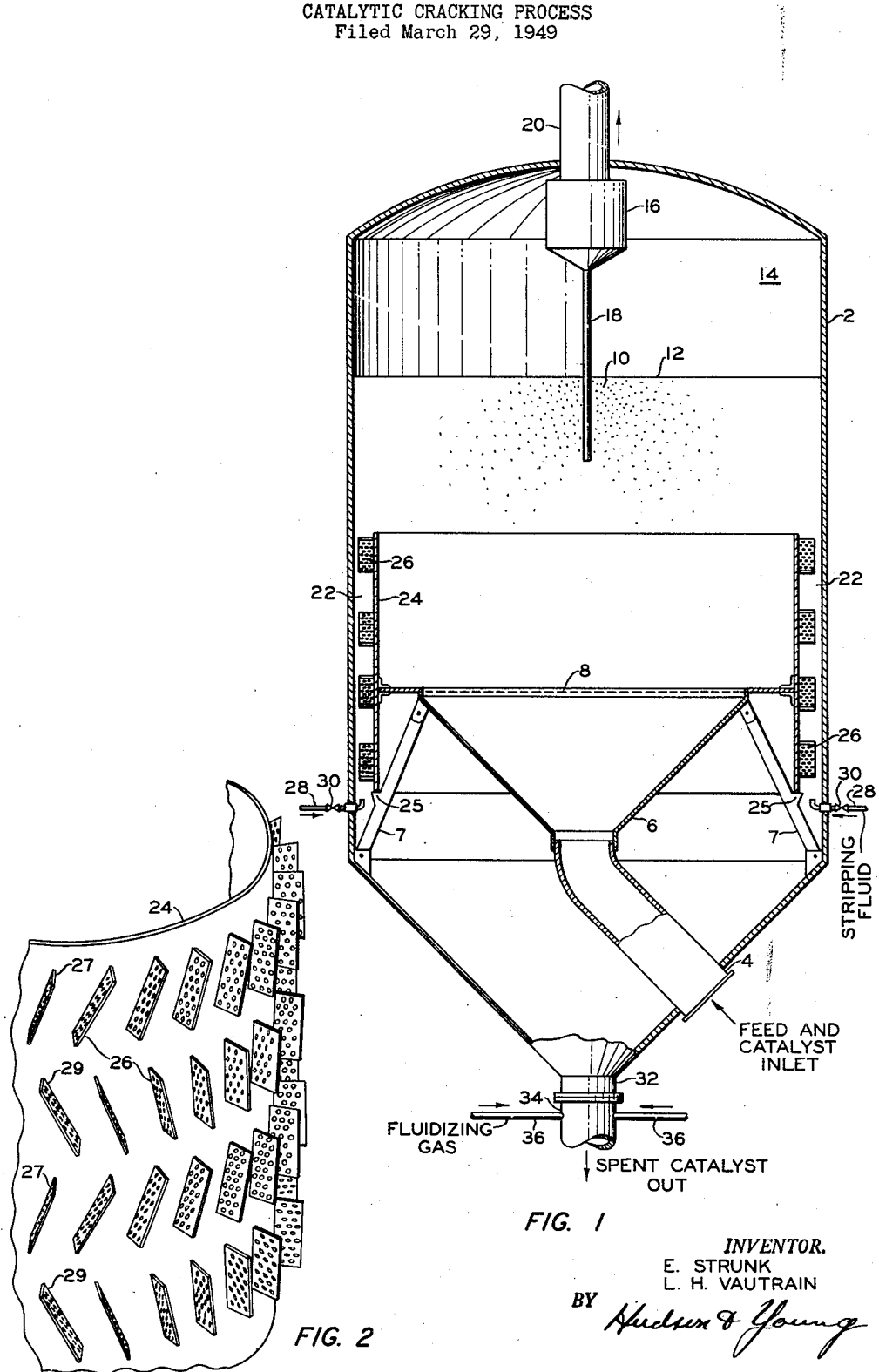

2,554,426

UNITED STATES PATENT OFFICE 2,554,426

SPENT CATALYST STRIPPER FOR FLUID-
IZED CATALYTIC CRACKING PROCESS

Edward Strunk and Lucien H. Vautrain, Sweeny,
Tex., assignors to Phillips Petroleum Company,
a corporation of Delaware Application March 29, 1949, Serial No. 84,112

5 Claims. (Cl. 23—288)

This invention relates to contacting solid particles with gaseous fluids. In one embodiment it relates to stripping or purging entrained volatile materials from solid particles. In a more specific embodiment this invention relates to apparatus adapted for stripping volatile hydrocarbons from a used fluidized oil cracking catalyst.

In certain catalytic operations, such as the catalytic cracking of hydrocarbon oils to produce lower boiling hydrocarbons, hydrocarbon gases and/or vapors are entrained with the catalyst or contact particles removed from the contacting or conversion zone and it is desirable to remove such vapors and/or gases from the particles before using them in another contacting or conversion step or before regenerating them prior to re-use. Although various types of stripping gases have been suggested steam is very desirable for this purpose, however, other types of stripping gases, such as spent combustion gases, low molecular weight hydrocarbon gases, and the like, may be employed.

In the improved design of catalytic cracking units, the catalyst or contact particles are maintained in a dense, dry, fluidized condition in the reaction zone wherein hydrocarbons in vapor or gas form are contacted with the solid contact particles. The hydrocarbon vapors or gases pass upwardly through the dense fluidized mixture in the reaction zone and the vaporous reaction products containing only a small amount of entrained solid particles are taken overhead from the reaction zone. The spent or contaminated contact or catalyst particles are withdrawn as a dense fluidized mixture from a lower portion of the reaction zone. The spent or contaminated particles which are withdrawn from the reaction zone contain entrained hydrocarbon vapors or gases, and before regenerating the particles it is desirable to remove the entrained hydrocarbons in a stripping or purging step to recover the hydrocarbons and to reduce the amount of burning necessary in the regeneration zone.

In accordance with the present invention, the contaminated catalyst or contact particles pass in a fluidized phase from the lower portion of the reaction vessel or zone into an annular space or stripping zone situated below the reaction zone. The annular space or stripping zone is formed between the inner wall of a reaction vessel and the outer wall of a vertically arranged elongated annular baffle or sleeve positioned in the lower portion of the reaction vessel and in sealed relationship with a feed inlet distribution plate. A plurality of baffle plates, preferably perforated, are attached to the outer wall of the annular baffle or sleeve and extend radially into the annular space without touching the inner wall of the reaction vessel. These baffle plates are spaced from each other and arranged so as to form a plurality of first and second vertical rows, with the baffle plates forming the first and second rows arranged in alternating positions in regard to one another, the second vertical rows of baffle plates being out of line with the first vertical rows so that when catalyst passes from the baffle plates of the first rows it will fall on the baffle plates of the second rows and when it passes from the baffles of the second rows it will fall on the baffles of the next lower first rows, etc. The radially extending baffle plates forming the first rows are inclined downwardly at an angle of from 15 to 75 degrees and preferably from 25 to 50 degrees from the vertical with the baffle plates in the second rows inclined at the same angle from the vertical but in the opposite direction to that of the baffles in the first rows so that as the catalyst passes downwardly from baffles of the first rows it will flow in one direction and will flow downwardly in the opposite direction as it passes over baffle plates in the second rows following a zig-zag course. As spent catalyst moves downwardly through the annular space or stripping zone of the reaction vessel and over the baffle plates contained therein, a stripping medium is introduced at a plurality of points into the lower portion of the stripping zone or annular space and rises countercurrently to the flow of the spent catalyst, whereby the volatile material is stripped from the catalyst. Due to this spacing of the radially and downwardly extending perforated baffle plates in the stripping zone and because of the manner of flow of the catalyst downwardly through these perforated baffles in a plurality of zig-zag paths whereby the catalyst is mixed at each change of direction along the path of flow, channeling of the catalyst is eliminated and better contact of stripping fluid with catalyst is obtained. It is known that improved results are obtained if the stripping gas moves countercurrent to the catalyst particles in a stripping section having a high ratio of length to diameter. The present invention provides such a relatively long path for catalyst to flow countercurrent to the stripping medium, without the disadvantage of having closed channels of flow through which the stripping medium can by-pass part of the catalyst stream. The flow of the stripping fluid to the lower portion of the annular space may be controlled by a control valve or, as an alternative, a single control on a header that is common to all inlet points may be used. The amount of stripping fluid introduced will depend upon the amount of hydrocarbon material to be stripped from a given amount of catalyst. The desired amount of stripping fluid introduced at any given time may be controlled by opening or closing the control valves associated with the stripping fluid lines.

An object of this invention is to provide an improved design for stripping volatile material adsorbed on or associated with solid contact particles. Another object is to provide an improved apparatus for stripping volatile hydrocarbon material from a fluidized oil cracking catalyst. Other objects and advantages of this invention will be apparent from the accompanying disclosure and discussion.

With the general nature and objects in view, the invention will be better understood by reference to the accompanying diagrammatic drawing which illustrates one form of equipment which may be utilized in carrying out the invention. This invention will be specifically described in connection with catalytic cracking of hydrocarbons but it is to be understood that this is by way of illustration only and that this invention may be used in other processes, such as hydrogenation, dehydrogenation, reforming or the like, where it is desired to remove strippable material from subdivided solids.

In the drawings:

Figure 1 represents a vertical longitudinal cross-section of one form of apparatus adapted to be used in carrying out this invention.

Figure 2 is a view showing one arrangement of the perforated baffle plates which may be used in practicing this invention.

Referring now to Figure 1 of the drawing, the reference character 2 designates a reactor having an inlet 4 through which a mixture of solid catalyst or contact particles and reactants is passed. The oil, prior to being introduced into reactor 2, is vaporized, either prior to mixing the catalyst therewith or by adding sufficient hot regenerated catalyst to the oil to effect the vaporization. When employing a topped or reduced crude in the cracking process the amount of catalyst intermixed with the oil should be sufficient to completely adsorb the unvaporized constituents of the crude and thereby form a relatively dry suspension of oil vapors and catalyst. The resulting mixture is passed through inlet 4, inverted conical member 6 and perforated distribution plate 8 to reactor 2. Conical member 6 is held in position by support members 7.

The velocity of the oil vapors passing upwardly through reactor 2 is preferably controlled to cause the bulk of the catalyst to segregate into a relatively dense layer in the lower portion of the reactor, as shown at 10 with a level indicated at 12. When employing a catalyst having a particle size less than about 200 mesh, this velocity may be of the order of from about 0.5 to 5 feet per second and preferably between 1 and 3 feet per second.

The reactor 2 is preferably constructed of such height as to provide a substantially free space 14 above the layer of catalyst within reactor 2 in order to reduce the amount of entrained catalyst removed from the reactor with the gaseous reaction products. In general, free space 14 in reactor 2 above level 12 should be in the order of from 5 to 15 feet or more. Level 12 of the dense layer of catalyst material in reactor 2 may be regulated within limits by controlling the rate of withdrawal of the catalyst from the reactor. The depth of the layer is regulated to provide adequate contact time for obtaining the desired conversion. When starting up the process and employing fresh catalyst having a relatively high order of activity, the level within the reactor will be controlled to give a relatively short contact time so as to avoid overcracking. However, as the activity of the catalyst depreciates, the level of the catalyst is increased, thereby increasing the contact time to compensate for the drop of the activity of the catalyst. The cracked products, after passing through reactor 2, are introduced into cyclone separator 16 for removal of catalyst entrained therein. As illustrated, this separator is shown mounted at the upper end of reactor 2. It will be understood, however, that the separator may be positioned outside the reactor. Other suitable separating devices, such as filters, precipitators, or the like, may be used in place of the cyclone separator.

The catalyst separated from the cracked products in separator 16 is returned to the fluidized catalyst bed 10 in the lower portion of reactor 2 through vertical conduit 18. The cracked products, after passing through the cyclone separator 16, are withdrawn through line 20 and are passed into a fractionating system, not shown, for recovering desired products.

Reactor 2 may be maintained at a temperature in the range of 850 to 1100° F. but it is preferable to maintain this temperature in the order of 925 to 1025° F. The pressure on reactor 2 is usually low, preferably in the range of 1 to 15 p. s. i. g., but in some cases it may be higher, depending upon the particular circumstances.

The catalyst employed for the cracking operation may be an activated clay or a synthetic gel comprising silica and alumina or other types of adsorbent gels suitable for effective conversion. The catalyst may be finely divided or in bead form. It is preferred to employ catalysts in a finely divided form having a particle size finer than 200 mesh. The amount of hot regenerated catalyst introduced into the oil stream contained in inlet 4 may vary over a considerable range, depending upon the type of oil treated, the degree of conversion desired, type of products desired, the temperature of the cracking treatment, and other factors. In general, the amount of catalyst so introduced will be of the order of from 1 to 20 or more parts by weight of catalyst per part of oil, but the preferred amount is from 1 to 10 parts by weight of catalyst per part of oil.

During the catalytic cracking operation, coke or carbonaceous material is deposited on the catalyst particles and the particles become spent or deactivated. The spent catalyst particles are then withdrawn from reactor 2 and sent to a regeneration zone, not shown, where the coke or carbonaceous material is burned and the hot regenerated catalyst particles are returned to reactor 2 through inlet 4. Before passing the spent or contaminated catalyst particles to the regeneration zone, it is preferred practice to pass them through a stripping or purging zone to remove entrained vapors and gases and some of the adsorbed hydrocarbon vapors and gases by means of a stripping gaseous fluid.

Arranged around the periphery of conical member 6 at the lower portion of reactor 2 is an annular space 22 which is formed between the inner wall of reactor 2 and a smaller-diameter, concentrically and vertically arranged sleeve or baffle 24 which extends a distance above and a distance below distribution plate 8. Sleeve 24 is in sealed relationship with the periphery of perforated plate 8 in such a manner as to prevent catalyst particles from falling between sleeve 24 and the periphery of plate 8. As an alternative, sleeve 24 may be in sealed relationship with the periphery of conical member 6. Sleeve 24 rests on lugs 25 fastened to support members 7.

In annular space 22 are arranged a plurality of perforated baffle plates 26, each attached to the outer wall of sleeve 24 and extending radially in the annular space 22 without touching the outer wall of reactor 2. The radially extending baffle plates 26 are spaced from one another and arranged so as to form vertical rows 27 and 29 with the baffles in rows 27 inclined downwardly at an angle of from 15 to 75 degrees from the vertical and with baffle plates in rows 29 inclined at the same angle from the vertical but in the opposite direction to that of the baffles in rows 27. The baffle plates 26 forming vertical rows 27 and 29 also form circumferential rows with the plates within each row being inclined in the same direction and in the opposite direction to that in the adjacent rows. Each baffle plate 26 is disposed in spaced-apart vertical overlap relation with at least one of baffle plates 26 in an adjacent circumferential row. This arrangement is clearly shown in Figure 2. The actual size of baffles 26 and the number of perforations contained therein will depend upon circumstances of each particular case. The arrangement of baffle plates 26 in this manner in annular space 22 prevents channeling of the catalyst and provides better contact of stripping fluid with the catalyst whereby more efficient stripping is obtained.

Catalyst containing strippable material is continuously withdrawn from the main fluidized bed 10 of reactor 2 through annular space 22 containing baffles 26. A gaseous stripping fluid, such as steam, is passed through lines 28 and control valves 30 to the lower end of annular space 22 and then the stripping fluid flows countercurrent to the catalyst flowing downwardly through annular space 22 containing baffles 26, thereby stripping volatile hydrocarbon material from the catalyst particles. The stripping fluid has a vertical velocity in the range of between about 0.05 and 3.0 feet per second.

The stripped catalyst particles from annular pace 22, still in dense fluidized condition, pass to the lower-conical part of reactor 2 and through outlet 32 to standpipe 34. A fluidizing gas is introduced through lines 36 to maintain the catalyst particles in liquid-like condition in standpipe 34. The standpipe 34 is used for the purpose of producing sufficient hydrostatic pressure at the base thereof to aid in moving the spent and stripped catalyst particles to a regeneration zone, not shown.

While a certain number of perforated baffle plates have been shown in the drawing, it is to be understood that these are for illustration only and the number of such baffle plates may be changed while still obtaining the benefits of this invention. Also, only one annular sleeve has been shown in the drawing and it is to be understood that two or more such annular sleeves may be employed. For example, a cylindrical annular sleeve may be positioned in annular space 22 between the inner wall of reactor 2 and annular sleeve 24, thereby dividing annular space 22 into two annular spaces. Perforated baffle plates 26 may be placed in each of the annular spaces in a manner similar to that used in annular space 22.

It is to be understood that this invention should not be unnecessarily limited to the above discussion and description, and that modifications and variations may be made without departing from the scope of the invention or the scope of the claims.

What is claimed is:

1. In an apparatus of the character described which includes, in combination, a vessel adapted to contain a fluidized bed of solid particles and for contacting gaseous fluid and said solid particles, and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged elongated annular sleeve member in sealed contact with the periphery of said perforated plate and extending a distance above and a distance below said perforated plate and arranged to provide an annular space between said inner wall of said vessel and said sleeve member, the improvement which comprises a plurality of perforated baffle plates arranged circumferentially in rows in said annular space, said baffle plates being spaced from one another and attached to the outer wall of said annular sleeve and extending radially into said annular space without touching the wall of said vessel, said baffle plates comprising each row being inclined at an angle of from 15 to 75 degrees from the vertical and in the opposite direction to that of the baffle plates of the preceding row, each said baffle plate being disposed in space-apart vertical overlap relation with at least one baffle plate in an adjacent circumferential row, a plurality of inlets for introducing stripping fluid into the lower portion of said annular space whereby said stripping fluid passes upwardly through said annular space containing said perforated baffle plates in contact with solid particles flowing down through said space between the inner wall of said vessel and said sleeve member from above said perforated plate countercurrent to the upflowing stripping fluid to strip the solid particles of entrained volatile material.

2. In an apparatus of the character described which includes, in combination, a vessel adapted to contain a fluidized bed of solid particles and for contacting gaseous fluid and said solid particles, and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged elongated annular sleeve member in sealed contact with the periphery of said perforated plate and extending a distance above and a distance below said perforated plate and arranged to provide an annular space between said inner wall of said vessel and said sleeve member, the improvement which comprises a plurality of perforated baffle plates arranged circumferentially in rows in said annular space, said baffle plates being spaced from one another and attached to the outer wall of said annular sleeve and extending radially into said annular space without touching the wall of said vessel, said baffle plates comprising each row being inclined at an angle of from 25 to 50 degrees from the vertical and in the opposite direction to that of the baffle plates of the preceding row, each said baffle being disposed in spaced-apart vertical overlap relation with at least one baffle plate in an adjacent circumferential row, a plurality of inlets for introducing stripping fluid into the lower portion of said annular space whereby said stripping fluid passes upwardly through said annular space containing said perforated baffle plates in contact with solid particles flowing down through said space between the inner wall of said vessel and said sleeve member from above said perforated plate countercurrent to the upflowing stripping fluid to strip the solid particles of entrained volatile material.

3. In an apparatus of the character described which includes, in combination, a vessel adapted to contain a fluidized bed of solid particles and for contacting gaseous fluid and said solid particles, and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged elongated annular sleeve member in sealed contact with the periphery of said perforated plate and extending a distance above and a distance below said perforated plate and arranged to provide an annular space between said inner wall of said vessel and said sleeve member, the improvement which comprises a plurality of baffle plates arranged vertically in rows in said annular space, said baffle plates being spaced from one another and attached to the outer wall of said annular sleeve and extending radially into said annular space without touching the wall of said vessel, said baffle plates comprising each row being inclined at an angle of from 15 to 75 degrees from the vertical and in the opposite direction to that of the baffle plates of the preceding row, each said baffle being disposed in spaced-apart vertical overlap relation with at least one adjacently positioned baffle plate, a plurality of inlets for introducing stripping fluid into the lower portion of said annular space whereby said stripping fluid passes upwardly through said annular space containing said baffle plates in contact with solid particles flowing down through said space between the inner wall of said vessel and said sleeve member from above said perforated plate countercurrent to the upflowing stripping fluid to strip the solid particles of entrained volatile material.

4. In an apparatus of the character described which includes, in combination, a vessel adapted to contain a fluidized bed of solid particles and for contacting gaseous fluid and said solid particles, and having a top outlet for gaseous fluid and a bottom outlet for solid particles, an inverted conical inlet member arranged in the lower part of said vessel provided at its upper end with a horizontally extending perforated plate, said conical member and perforated plate being arranged centrally of said vessel and spaced from the inner wall of said vessel, a vertically arranged elongated annular sleeve member in sealed contact with the periphery of said perforated plate and extending a distance above and a distance below said perforated plate and arranged to provide an annular space between said inner wall of said vessel and said sleeve member, the improvement which comprises a plurality of perforated baffle plates positioned so as to form rows extending circumferentially about said annular space and rows extending vertically in said annular space, said baffle plates being spaced from one another and attached to the outer wall of said annular sleeve and extending radially into said annular space without touching the wall of said vessel, said baffle plates comprising each row being inclined at an angle of from 15 to 75 degrees from the vertical and in the opposite direction to that of the baffle plates of the preceding row, each said baffle being disposed in spaced-apart vertical overlap relation with at least one baffle plate in an adjacent circumferential row, a plurality of inlets for introducing stripping fluid into the lower portion of said annular space whereby said stripping fluid passes upwardly through said annular space containing said perforated baffle plates in contact with solid particles flowing down through said space between the inner wall of said vessel and said sleeve member from above said perforated plate countercurrent to the upflowing stripping fluid to strip the solid particles of entrained volatile material.

5. In an apparatus of the character described which includes, in combination, a vessel adapted to contain a fluidized bed of solid particles and for contacting gaseous fluid and said solid particles and having a top outlet for gaseous fluid and a bottom outlet for solid particles, an inlet member extending into said vessel for admitting catalyst and gaseous fluid feed into a contacting section in said vessel, a vertically arranged elongated sleeve member in said vessel in sealed contact therein with the periphery of said inlet member and extending a distance above and a distance below the point of said contact to provide an annular space between the inner wall of said vessel and said sleeve member, the improvement which comprises a plurality of baffle plates positioned to form rows extending circumferentially about said annular space and rows downwardly extending through said annular space, said baffle plates being attached to the outer wall of said annular sleeve and extending radially into said annular space without touching the wall of said vessel, said baffle plates comprising each of said rows being inclined at an angle of from 15 to 75° from the vertical and in an opposite direction to that of baffle plates in an adjacent row, each said baffle being disposed in spaced-apart vertical overlap relation with at least one baffle plate in an adjacent circumferential row, and a plurality of inlets for introducing stripping fluid into the lower portion of said annular space.

EDWARD STRUNK.
LUCIEN H. VAUTRAIN.

REFERENCES CITED

The following references are of record in the file of this patent:

UNITED STATES PATENTS

| Number | Name | Date |
|---|---|---|
| 2,415,755 | Ogorzaly et al. | Feb. 11, 1947 |
| 2,443,190 | Krebs | June 15, 1948 |